Feb. 22, 1966 R. W. DE MONTE 3,236,948

MULTIPLE STATION COMMUNICATION NETWORK

Filed June 29, 1962

INVENTOR
R. W. DE MONTE
BY Leonard [signature]
ATTORNEY

United States Patent Office 3,236,948

Patented Feb. 22, 1966

3,236,948
MULTIPLE STATION COMMUNICATION NETWORK

Robert W. De Monte, Berkeley Heights, N.J., assignor to Bell Telephone Laboratories, Incorporated, New York, N.Y., a corporation of New York Filed June 29, 1962, Ser. No. 206,292
5 Claims. (Cl. 179—1)

This invention relates to communication systems and more particularly to telephone circuits for establishing communication among three or more telephone subscriber lines.

Telephone conversations among three or more subscribers, known as conference calls, present a number of substantial problems. First, it is necessary to insure adequate signal levels among the subscribers and to compensate for line losses between distant subscriber stations. Second, the signal levels must be properly adjusted at all times in order to prevent regenerative circulation of signals among subscribers. Third, changes in the number of subscribers during the course of the call have resulted in the need for critical readjustment of equipment at those times. As a result, conference calls have heretofore required relatively delicate and complex arrangements usually employing a large number of amplifiers, and this equipment is often the subject of relatively delicate adjustment as the number of subscribers changes during the course of the call.

A principal object of this invention is to eliminate the need for relatively complex equipment in order to effect a conference call, and to provide apparatus whereby the signals are automatically maintained at their proper levels under the control of the subscribers.

A related object of this invention is to reduce the number of amplifier circuits required for conference calls.

A further object of this invention is to eliminate the need for relatively delicate adjustment of equipment when the number of subscribers to a conference call changes during the course of the call.

In accordance with the present invention, these objects are attained by bridging all the subscriber lines together through the use of a two-terminal negative impedance device, such as that disclosed in United States Patent 3,204,048, issued August 31, 1965, and automatically varying the "gain" of the device under the control of the subscribers. The "gain" of the negative impedance device is automatically increased as each subscriber is added to the conference call by automatically decreasing the impedance of the terminating network associated with the device, and the "gain" of the negative impedance device is automatically reduced as each subscriber leaves the conference call by automatically increasing the impedance of the terminating network associated with the device.

Figure 1A:
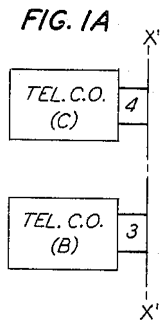
Figure 1:
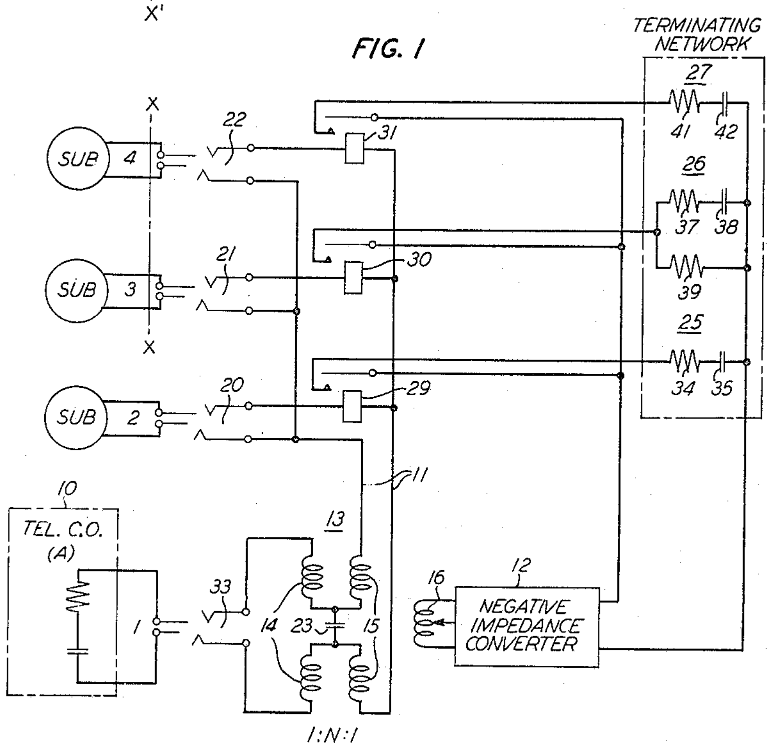

The invention will be more fully comprehended from the following detailed description taken in conjunction with FIGS. 1 and 1A which represent a block diagram of a conference circuit embodying this invention.

As outlined by George Grisson in his article "Negative Impedances and the Twin 21-Type Repeater" which appeared at page 485 of the July 1931 issue of the Bell System Technical Journal, negative impedances fall into one or the other of two categories. The first category includes negative impedances of the open-circuit stable or series type, while the other includes those of the short-circuit stable or shunt type. Both types of negative impedances may be conveniently produced by active devices known as negative impedance converters. A negative impedance converter produces a two-terminal impedance which is negatively related to a specific passive two-terminal terminating impedance over a predetermined frequency range and is open-circuit stable or short-circuit stable, depending upon the classification of the negative impedance produced.

This invention employs a two-terminal negative impedance repeater of the short-circuit stable type, such as, for example, that disclosed by applicant in his above-mentioned copending application. In FIG. 1 a telephone central office 10 is coupled to a balanced non-loaded two-wire transmission line 11, with gain inserted by the bilateral negative impedance repeater disclosed in the above-mentioned copending application. In the repeater, a negative impedance converter 12 of the short-circuit stable or shunt type is coupled to the line by a transformer 13 having three mutually coupled windings 14, 15 and 16. These windings, as indicated, have a turns ratio of 1:N:1, respectively, and each winding is divided into two sections for balance. The upper sections of the first two windings 14 and 15 are connected in series with each other on one side of the line, while the lower sections of these windings 14 and 15 are connected in series with each other on the other side of the line. All four sections of windings 14 and 15 are in series aiding relation with one another. The negative impedance converter 12 is connected across both sections of the third winding 16 of transformer 13. As illustrated, transmission line 11 may terminate in a series of telephone sets or connections to other subscribers at other central offices which may be connected to the line 11 by means of a series of jacks 20, 21 and 22. A capacitor 23, as disclosed in the above-mentioned copending application, is connected across the line from the junction between the upper sections of windings 14 and 15 to the junction between the lower sections of the same windings in order to selectively introduce gain into the non-loaded transmission line. The presence of capacitor 23 effectively connects the repeater in series with the line 11 at one end of the line frequency band and in shunt across the transmission line at the other end of its band so that the transmission characteristic of the line is substantially flat with frequency. The terminating network of the repeater consists of a group of terminating networks 25, 26 and 27. These terminating networks 25, 26, 27 are connected in parallel to the negative impedance converter by the closure of the contacts associated with relays 29, 30 and 31, respectively.

When a call comes into a central office from a first subscriber at another telephone office 10 requesting a conference call, the operator connects the lines from central office 10 to the winding 14 of transformer 13 by means of jack 33. By means of jack 20 the operator then connects subscriber number 2 across line 11 and rings subscriber number 2. When subscriber number 2 answers the phone, battery current flows through relay 29 closing its associated contact and connecting terminating network 25 to the negative impedance converter. This introduces shunt gain and cancels out most of the line and junction losses. The operator then connects subscriber number 3 to line 11 by means of jack 21 and, when subscriber number 3 answers the phone, battery current flowing through relay 30 actuates its associated contact and connects terminating network 26 to the negative impedance converter 12. The resulting impedance connected to the converter 12 is now less than before, i.e., the negative admittance of the converter is increased, and the shunt gain of the converter is increased, thus reducing the bridging loss associated with connecting the subscribers to the line. Connecting the fourth subscriber to the conference call to the line increases the shunt gain in a similar manner to reduce bridging loss by automatically connecting terminating network 27 to the negative impedance converter 12.

Thus, in accordance with this invention signal levels among the subscribers are maintained at the proper levels by automatically increasing the shunt gain of the converter under the control of the subscribers as each subscriber is added to the conference call. In addition, in accordance with this invention, the gain is automatically reduced as each subscriber places his receiver "on hook." For example, should subscriber number 2 place his receiver "on hook," relay 29 releases, opening its associated contact and disconnecting terminating network 25 from the repeater. The resulting increase in the impedance of the terminating network increases the negative impedance introduced by the repeater and thereby reduces the shunt gain. This reduction in shunt gain also takes place automatically in the event that subscriber number 3 or 4 places his receiver "on hook." In the event, however, that the incoming call from central office 10 is disconnected but the three local subscribers are still talking, the shunt gain remains at a maximum and the transmission is further improved. The automatic maintenance of signals at their proper levels among the subscribers, in accordance with this invention, is achieved with relatively inexpensive equipment, and in accordance with this invention the need for delicate adjustment of equipment as the number of subscribers changes during the course of the call is totally eliminated.

Terminating network 25 comprises the series combination of a resistor 34 and a capacitor 35 and provides gain over the higher portions of the voice frequency band to overcome line and junction losses. Terminating network 26 comprises the parallel combination of the following circuits: the series combination of a resistor 37 and a capacitor 38; a resistor 39. The resistor portion 39 of this parallel combination provides additional gain particularly at the low frequency end of the voice band in order to overcome the additional bridging loss encountered when subscribers number 3 and 4 are connected to line 11. Terminating network 27 comprises the simple series combination of a resistor 41 and capacitor 42. The use of a parallel resistor in terminating network 27, as was used in terminating network 26, is not generally needed since its effect will be one of the second order after resistor 39 has raised the gain at the lower voice frequencies to overcome bridging losses. Based on a typical situation where the second, third and fourth subscribers are 6 kilofeet from their central office and the calling subscriber is at another central office, the following values for the terminating networks give excellent results.

| | | |
|---|---|---|
| Resistor **34** | Ω | 300 |
| Capacitor **35** | μf. | .120 |
| Resistor **39** | Ω | 2000 |
| Resistor **37** | Ω | 300 |
| Capacitor **38** | μf. | .100 |
| Resistor **41** | Ω | 450 |
| Capacitor **42** | μf. | .08 |

It should be recognized that in accordance with this invention only one subscriber among subscribers number 2, 3 and 4 need be at the central office which the first subscriber calls requesting a conference call. Thus, for example, subscriber number 3 and subscriber number 4 may be at other central offices, as shown in FIG. 1A, in which case the negative impedance device may be located at the central office to which either subscriber number 2, 3 or 4 is connected. Of course, if two or more subscribers are located at the same central office then the negative impedance device would be employed, for convenience, at that office. Assuming, for example, that subscribers number 3 and 4 are at distant central offices, then when they answer their phones they increase the gain, as before, and reduce the line losses. In addition, of course, all the subscribers could be at the same central office in which case the first subscriber's phone would be connected to the line 11 by means of jack 33.

The equipment employed, in accordance with this invention, is relatively simple as compared with the equipment of the prior art and, as described, provides for automatic adjustment of gain as each called subscriber answers his phone and later places his receiver "on hook." In this manner the need for delicate adjustment of the equipment as the number of parties to the conference call changes is completely eliminated.

It is to be understood that the above-described arrangements are illustrative of the application of the principles of the invention. Numerous other arrangements may be devised by those skilled in the art without departing from the spirit and scope of the invention.

What is claimed is:

1. In a communication circuit for establishing multiple connections between subscribers, a transmission line adapted to carry a predetermined band of frequencies, means to connect each of the subscriber lines to said transmission line, a two-terminal negative impedance device connected to said transmission line, means to automatically increase the shunt gain of said negative impedance device as each subscriber line is connected to said transmission line, and means to automatically reduce the shunt gain of said negative impedance device as each subscriber line is disconnected from said transmission line.

2. In a communication circuit for establishing multiple connections between subscribers at a first central office and a subscriber at a second central office, a transmission line adapted to carry a predetermined band of frequencies, means to connect the subscriber lines at said first central office to said transmission line and means to couple the subscriber line at said second central office to said transmission line, a two-terminal negative impedance device connected to said transmission line, means to automatically increase the shunt gain of said negative impedance device as each subscriber line at said first central office is connected to said transmission line, and means to automatically reduce the shunt gain of said negative impedance device as each subscriber line is disconnected at said first central office from said transmission line.

3. In a communication circuit for establishing multiple connections between called subscribers at a plurality of central offices and a calling subscriber, a transmission line adapted to carry a predetermined band of frequencies, a two-terminal negative impedance device of the short-circuit stable type located at the central office of one of said called subscribers and effectively in series with said transmission line at one end of said band and in shunt across said transmission line at the other end of said band, means to automatically increase the shunt gain of said negative impedance device as each called subscriber line is connected to said transmission line, and means to automatically reduce the shunt gain of said negative impedance device as each called subscriber line is disconnected from said transmission line.

4. In a communication circuit for establishing multiple connections between subscribers, a transmission line adapted to carry a predetermined band of frequencies, means to connect each of the subscriber lines to said transmission line, a two-terminal negative impedance device of the short-circuit stable type having a shunt gain which is a function of the impedance of a terminating network connected to said device, the negative impedance device being effectively connected in series with said transmission line at one end of said band and in shunt across said transmission line at the other end of said band, means to automatically increase the shunt gain of said negative impedance device by reducing the impedance of said terminating network as each subscriber line is connected to said transmission line, and means to automatically reduce the shunt gain of said negative impedance device by increasing the impedance of said terminating network as each subscriber line is disconnected from said transmission line.

5. In a communication circuit for establishing multiple connections between subscribers at a first central office and a subscriber at a second central office, a transmission line adapted to carry a predetermined band of frequencies, means to connect the subscriber lines at said first central office to said transmission line and means to couple the subscriber line at said second central office to said transmission line, a two-terminal negative impedance device of the short-circuit stable type having a shunt gain which is a function of the impedance of a terminating network connected to said device, the negative impedance device being effectively connected in series with said transmission line at one end of said band and in shunt across said transmission line at the other end of said band, means to automatically increase the shunt gain of said negative impedance device by reducing the impedance of said terminating network as each subscriber line at said first central office is connected to said transmission line, and means to automatically reduce the shunt gain of said negative impedance device by increasing the impedance of said terminating network as each subscriber line is disconnected at said first central office from said transmission line.

References Cited by the Examiner

FOREIGN PATENTS 594,844 3/1960 Canada.

ROBERT H. ROSE, *Primary Examiner.*

WILLIAM C. COOPER, *Examiner.*